United States Patent [19]

Takiyama et al.

[11] Patent Number: 5,440,685
[45] Date of Patent: Aug. 8, 1995

[54] APPARATUS AND METHOD FOR CONTROLLING MANIPULATION AND STORAGE OF IMAGE DATA

[75] Inventors: Shushi Takiyama; Hitoshi Matsumoto; Yuzuru Koga, all of Kawasaki, Japan

[73] Assignee: Fujitsu Limited, Kawasaki, Japan

[21] Appl. No.: 103,751

[22] Filed: Aug. 10, 1993

[30] Foreign Application Priority Data

Nov. 2, 1992 [JP] Japan .................................. 4-294656

[51] Int. Cl.⁶ .............................................. G06F 12/00
[52] U.S. Cl. ..................................... 395/164; 395/494
[58] Field of Search ...................... 395/162, 164, 425; 345/185, 201, 203; 378/62, 98.5

[56] References Cited

U.S. PATENT DOCUMENTS 4,943,987 7/1990 Asahina et al. ..................... 378/62
5,020,003 5/1991 Moshenberg ....................... 395/164

*Primary Examiner*—Mark R. Powell
*Assistant Examiner*—Kee M. Tung

*Attorney, Agent, or Firm*—Staas & Halsey

[57] ABSTRACT

An apparatus including an image pick-up device, a data storage controlling arrangement, a main memory, a mass storage device, and a manipulation size setting unit. The image pick-up device picks up images to produce image data and stores the same into a frame buffer. The main memory offers rapid access but low storage capacity and stores the image data supplied from the frame buffer. The mass storage device is capable of holding a vast amount of memory but cannot be accessed very quickly. It also stores the image data supplied from the frame buffer. The manipulation size setting unit sets a mask region and a frame rate both of which are necessary for storing the image data into the mass storage device. The data storage controlling arrangement controls storage of the image data, in which the image data is stored in the mass storage device when the same is capable of storing the image data at an inherent frame rate larger than or equal to the set frame rate, and in which the image data is stored in the main memory when the inherent frame rate is smaller than the set frame rate.

20 Claims, 8 Drawing Sheets

FIG. 2

FILE NAME    D : YMOVIE?????

FREE 16.256 BYTE

FILE-TYPE :

61a ☐ PRIMARY
61b ▣ MVE

CAPTURE :

62a ▣ VIDEO/AUDIO
62b ☐ VIDEO
62c ☐ AUDIO

MASK :

63a ▣ 1/2 (160x120 DOTS)
63b ☐ 1/4 (80x60 DOTS)

CLIP REGION :

64a ▣ ENTIRE
64b ☐ PORTION

FRAME RATE (FRAME/SEC.) :

65a ☐ 30
65b ▣ 15
65c ☐ 10
65d ☐ 7.5

SOUND QUALITY :

66a ☐ HIGH
66b ▣ NORMAL

RECORD TIME
　　??MIN.  ??SEC.

67 ( OK )    68 ( CANCEL )

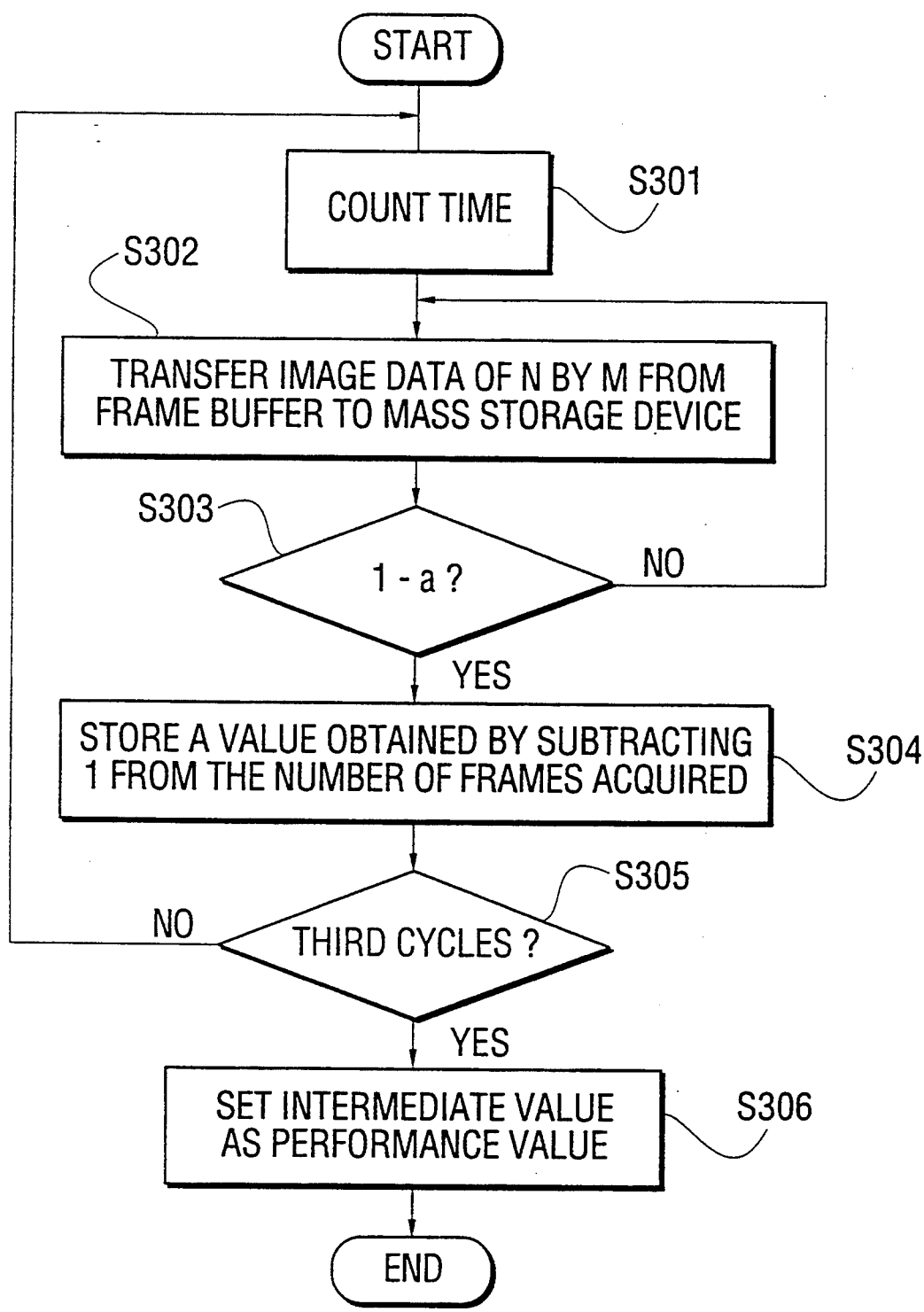

APPARATUS AND METHOD FOR CONTROLLING MANIPULATION AND STORAGE OF IMAGE DATA

BACKGROUND OF THE INVENTION

This invention relates to an apparatus and a method for controlling image manipulation and storage. More particularly, this invention relates to an apparatus and a method for storing image data into digital storage in accordance with a device measure determined by the user's action.

An image processing system generally performs acquisition, storage, processing, communication and display of images. A digital image is acquired through an image pick-up device such as a vidicon camera or a TV camera. The image pick-up device produces an entire image of the problem domain every 1/30 sec., for example. This time interval is often called one frame or one frame time. A digital image thus consists of a plurality of frames and is stored in a storage as the image data. As well known in the art, an 8-bit image of size 1024 by 1024 pixels requires one million bytes of storage. Thus, providing adequate storage is a challenge in the design of image processing systems. With this respect, more recent image processing systems are generally designated to easily connect to a large video random-access memory (VRAM) array for image storage and display as well as a dynamic random-access memory (DRAM) for program and data memory. The video RAM was first offered by Texas Instruments and has been through several iterations, with densities now reaching 1 Mbit. The basic VRAM offerings contain a serial access port that allows delivery of an entire row of data to a video subsystem or other storage. With screen resolution up to 512 by 512 pixels, VRAMs can handle video scanout unassisted. With higher-resolution display, the pixel rate exceeds the VRAMs' serial-port data rate, so that they are connected to a memory such as a high-speed off-chip shift register or the like. Such a short term storage can be accessed rapidly but the capacity thereof is relatively small. Accordingly, the image data are stored therein only for a short time.

SUMMARY OF THE INVENTION

The present invention is directed to overcome the above mentioned problem and an object thereof is to provide an apparatus and a method for controlling image manipulation and storage by means of selecting storage in accordance with a manipulation size determined by the user's action.

An apparatus for controlling image manipulation and storage according to the present invention comprises an image acquiring unit, first storing unit, second storing unit, a device measure setting unit and a data storage controlling arrangement. The image acquiring unit acquires images to produce image data of an entire image of the problem domain every frame time. The first storing stores the image data rapidly that are supplied from the image acquiring unit. The first storing unit is low storage capacity. The second storing unit stores the image data slowly that are supplied from the image acquiring unit. The second storing unit holds vast amount of memory. The manipulation size setting unit is for setting a manipulation size, including a set mask region and a set frame rate, required for storing the image data into the second storing unit. The data Storage controlling arrangement controls storage of the image data, in which the same is stored in the second storing unit when the second storing unit used is capable of storing the image data at a frame rate larger than or equal to the set frame rate. On the contrary, the image data is stored in the first storing unit when the frame rate available for the second storing unit used is smaller than the set frame rate.

According to another aspect of the present invention, a method for controlling image manipulation and storage comprises the steps of acquiring image, setting a manipulation size, controlling and selecting storage for the image data obtained and storing the image data in the selected storage. Images are acquired and image data is produced by an entire image of the problem domain every frame time. The manipulation size, including a set mask region and a set frame rate, is set that is required for storing the image data into the second storing unit at a relatively low speed. The image data is stored in the selected one of the second storing unit and first storing unit for storing the image data at a relatively high speed. More particularly, the image data is stored in the second storing unit when it is capable of storing the same at a frame rate larger than or equal to the set frame rate. On the contrary, the image data is stored in the first storing unit when the frame rate available for the second storing unit used is smaller than the set frame rate.

BRIEF DESCRIPTION OF THE DRAWING

For the purpose of illustrating the invention, there is shown in the drawing a form which is presently preferred; it being understood, however, that this invention is not limited to the precise arrangements and procedures shown.

FIG. 2 is a view showing an example of manipulation size defined by a user;

FIG. 8 is a flow chart of a subroutine of the control operation carried out by the performance determining shown in FIG. 4.

DETAILED DESCRIPTION OF THE PREFERRED EMBODIMENT

Figure 1:
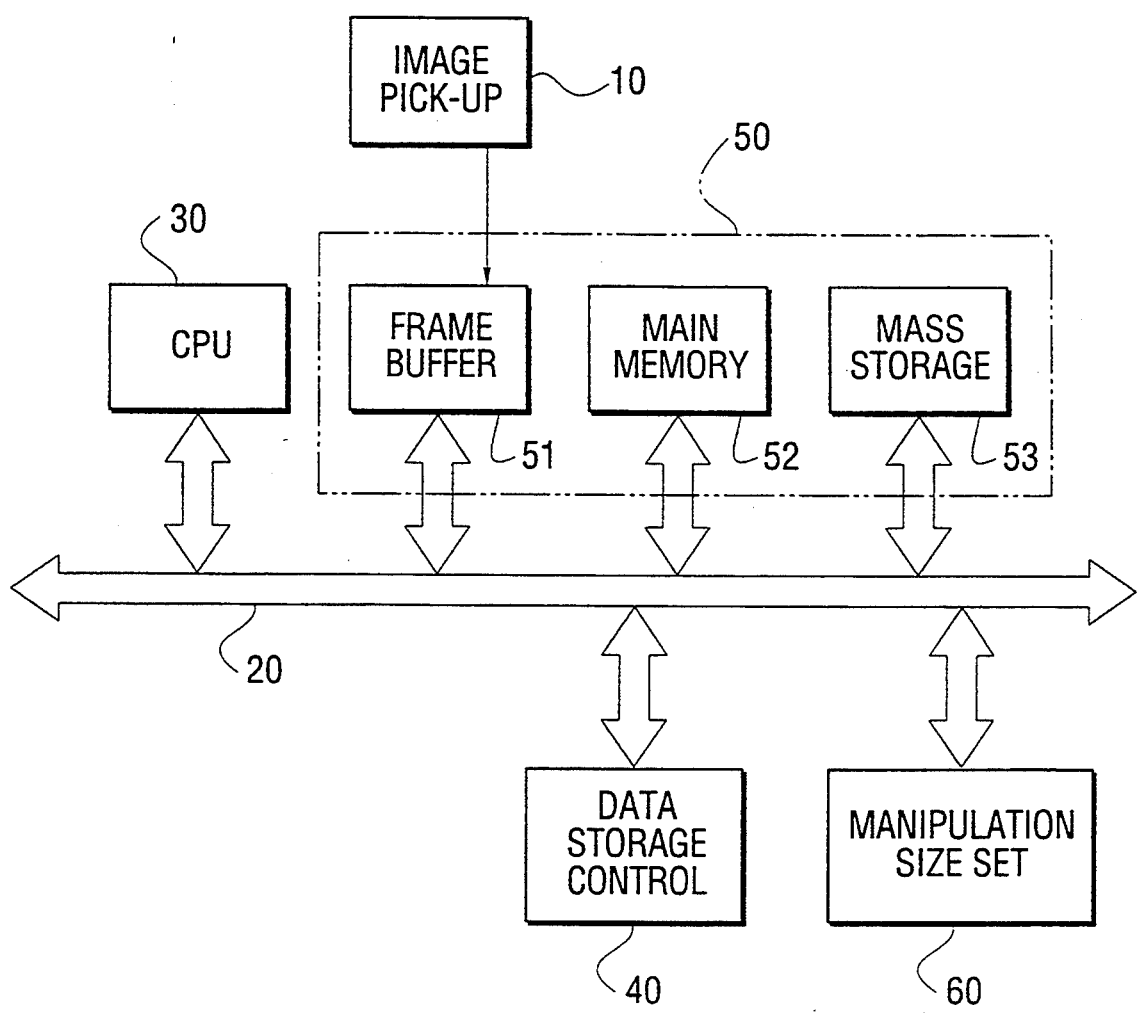
FIG. 1 is a schematical block diagram showing an apparatus for controlling manipulation and storage of image data according to an embodiment of the present invention.

Referring to the drawing wherein like numerals represent like elements, there is illustrated in FIG. 1 an apparatus for controlling acquisition and storing of image data according to an embodiment of the present invention.

In FIG. 1, the apparatus comprises an image pick-up device 10 on a system bus 20. The image pick-up device 10 may be a charged-coupled-device (CCD) camera or an image sensor that produces an electrical signal output. If the output of the camera or other image sensors is not already in digital form, an analog-to-digital converter digitizes it. A central processing unit (CPU) 30 and a data storage controlling arrangement 40 are also on the system bus and can thus access a multimedia storage system 50. The multimedia storage system 50 comprises a frame buffer 51, a main memory 52 and a mass storage device 53. The system bus 20 is further connected to a manipulation size setting unit 60. The frame buffer 51 is for short term storage that can store one or more images and can be accessed rapidly, usually at video rates (e.g., 15 or 30 complete images per second). In this embodiment, the frame buffer 51 is a dual-ported video random-access memory (VRAM). It is noted that a combination of the image pick-up device 10 and this frame buffer serves as an image acquiring arrangement. The main memory 52 serves as the primary storage that is relatively small in capacity while the mass storage device 53 serves as the secondary storage that is characterized by massive storage requirements. The main memory 52 holds image data until they are sent to the output unit or secondary storage such as a hard disk. This type of memory can offer rapid access, but low storage capacity. By comparison, the mass storage device 53 can hold vast amount of memory but cannot be accessed very quickly. The mass storage device 53 may be a hard disk, optical and/or magnetic recording media and so on.

The manipulation size setting unit 60 is for a manipulation size determined by the user's action and required for storing the image data supplied from the frame buffer 51, into the mass storage device 53. More particularly, the manipulation size setting unit 60 is connected to a keyboard (not shown) through which a user determines the manipulation size. The manipulation size includes a set mask region and a set frame rate. On setting, the manipulation size can appear on a monitor (not shown) such as a cathode ray tube (CRT) display for the user's convenience. An input device such as a mouse may be used depending on a graphical user interface environment. With the mouse, a user can enter instructions by moving the cursor to point to the desired object(s) on the-screen. Alternatively, a trackball or a tablet may be used rather than the mouse. At any rate, the digital image can be scaled up or down using technique such as pixel replication, area sampling and filtering. For an n by m mask, representing a mask region, it would take on the order of nm frame times. Two set masks available in the present embodiment are 160 by 120 pixels (half the size of original image) and 80 by 60 pixels (one-quarter the size of original image). The frame rate represents the number of images per second to be stored in the mass storage device 53. The frame rates may be 30, 15, 10 and 7.5 images per second.

Examples of the manipulation size and attributes are shown in FIG. 2. This information appears on the monitor screen. A file name is determined by a user for each file to be stored. A File-type menu represents a type of the file to be stored in the mass storage device 53. For a static image, a primary file option 61a is chosen from the File-type menu. In FIG. 2, check boxes filled with black indicate the current choice. A file of live or full motion video images requires to choose the a MVE (movie) file option 61b. A Capture menu represents which signal should be captured, i.e., an audio signal and/or a video signal. In TV broadcasting, an audio signal normally accompanies a video signal and occupies a small part of the video baseband. When both of the audio and video signals should be captured, a check box 62a for a Video and Audio option will be chosen. Otherwise, either one of a Video option 62b and an Audio option 62c to capture video and audio signals, respectively, are chosen. While not shown in the figures, the apparatus according to the present invention may comprise a sound input/processing unit such as a microphone to manipulate and store any audio data. To choose the set mask region, either one of check boxes 63a and 63b is checked. A Clip Region menu is for clipping images, if necessary. To check a check box 64a indicates that the entire image will be stored without clipping, while a portion of the image can be clipped by choosing a Clip option 64b. The frame rate can be selected from 30, 15, 10 and 7.5 images per second by choosing any one of options 65a throgh 65d. A Sound Quality menu is optional and if the video and audio option 62a or the audio option 62c is selected, either one of check boxes 66a and 66b is chosen. When a user determines all requirements, an OK button 67 is chosen. In response to a choice of the OK button 67, the control apparatus according to the present invention shifts into a storage-ready state. In this state, storage of the image data can be started at any time. A Cancel button 68 is for cancelling storage of the image data.

The data storage controlling arrangement 40 controls storage of image data. The image data is stored in the mass storage device 53 when the same is capable of storing the image data at the frame rate larger than or equal to the set frame rate. On the contrary, the image data is stored in the main memory 52 when the frame rate available for the mass storage device 53 is smaller than the set frame rate. Structure and operation of this data storage controlling arrangement 40 will be described later.

Figure 3:
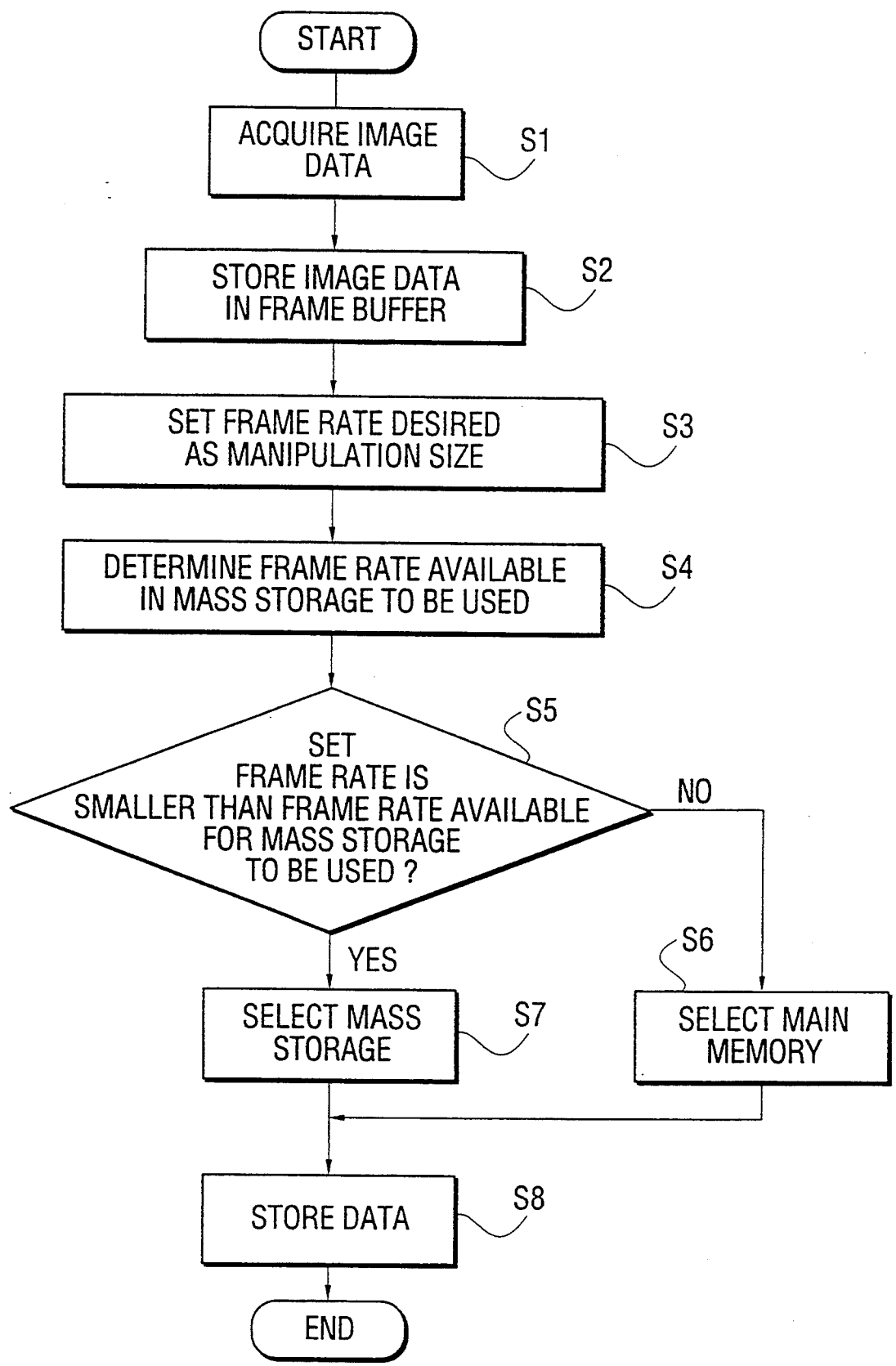
FIG. 3 is a flow chart of a basic control carried out by the apparatus shown in FIG. 1.

Referring to FIG. 3, described is operation of the control apparatus according to the embodiment of the invention.

At step S1, a digital image is acquired through the image pick-up device 10. The image data is initially stored in the frame buffer 51 at step S2. Subsequently, at step 3, the manipulation size (frame rate) is set through the manipulation size setting unit 60. When control passes to step S4, the data storage controlling arrangement 40 determines the frame rate available for the mass storage device 53. This frame rate is referred to as an inherent frame rate hereinafter because it is considered to be inherent for every mass storage device. At step S5, the set frame rate is compared with the inherent frame rate. The control passes to step S6 when the inherent frame rate is smaller than the set frame rate. At step S6, the main memory 52 is selected as the storage for the image data obtained. On the contrary, a negative decision at step S5 results in the selection of the mass storage device 53 as the selected storage for the image data obtained. In any event, the image data is stored in the selected storage at step S8.

Figure 4:
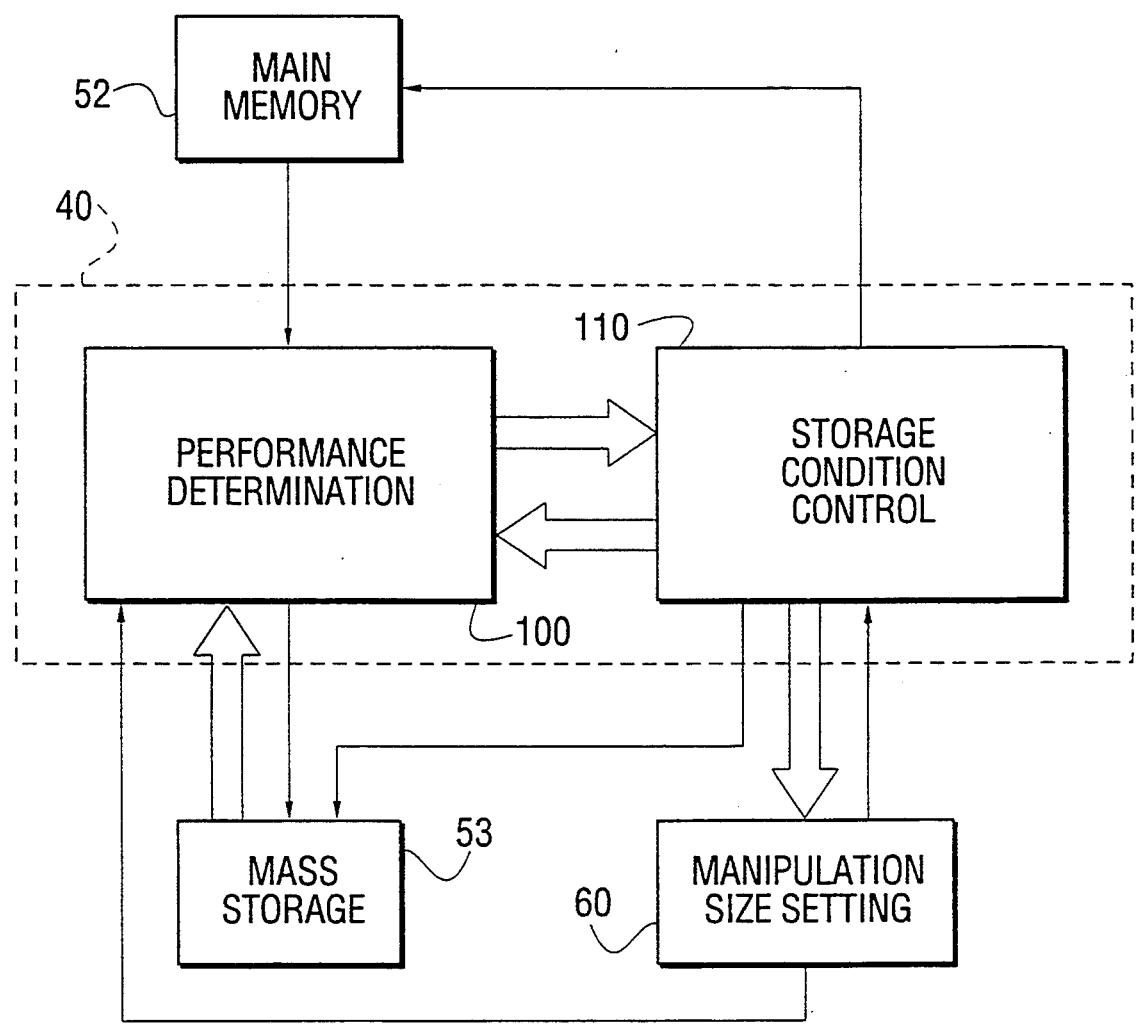
FIG. 4 is a block diagram showing a data storage controlling arrangement in FIG. 1.
Figure 5:
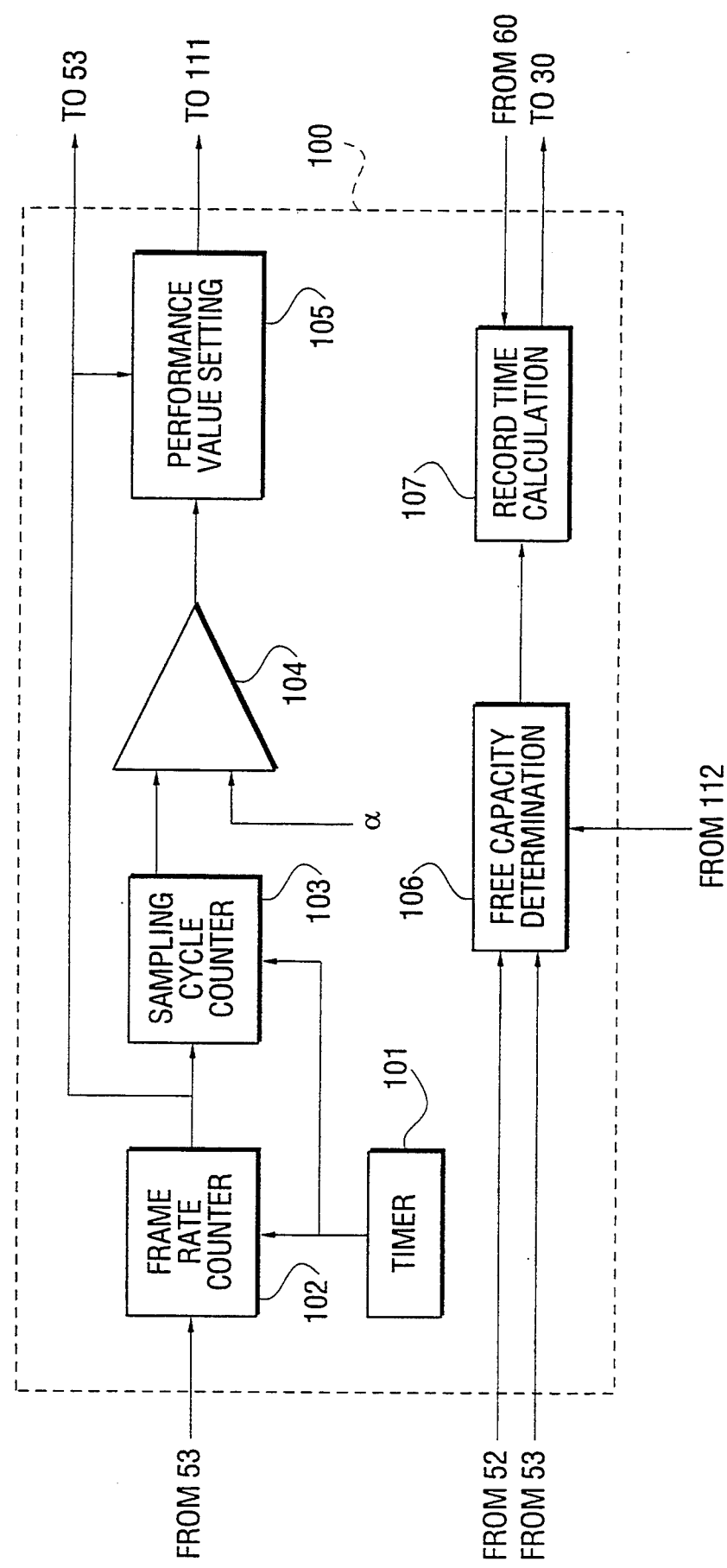
FIG. 5 is a block diagram showing an exemplary structure of a performance determining section in the data storage controlling arrangement illustrated in FIG. 4.
Figure 6:
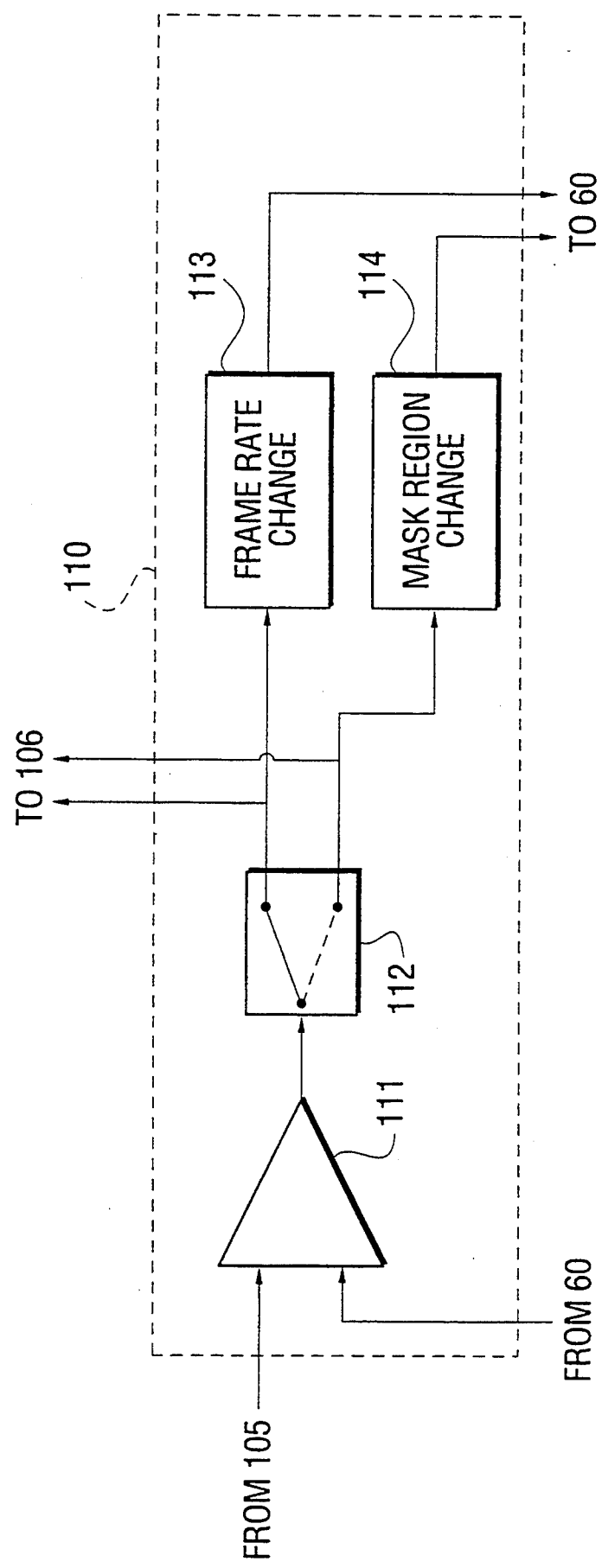
FIG. 6 is a block diagram showing an exemplary structure of a storage condition control section in the data storage controlling arrangement illustrated in FIG. 4.

Now, the data storage controlling arrangement 40 is described more in detail with reference to FIGS. 4 through 6. The data storage controlling arrangement 40 comprises a performance determining section 100 and a storage condition control section 110 connected to each other. The performance determining section 100 and the storage condition control section 110 are also connected to the main memory 52, the mass storage manipulation 53 and the device size setting unit 60. Details of the sections 100 and 110 are shown in FIGS. 5 and 6, respectively.

As shown in FIG. 5, the performance determining section 100 comprises a timer 101 connected to a frame rate counter 102 and a sampling cycle counter 103. Contents of the timer 101 are changed at regular intervals in such a manner as to measure time. An output of the timer 101 is used for determining the inherent frame rate of the mass storage device 53. The frame rate counter 102 is connected to the mass storage device 53 and the sampling cycle counter 103. The frame rate counter 102 counts, in response to the output of the timer 101, the number of sample frames or frame rate during a time interval of one second. In this event, the sample frame rate is given by subtracting one from an actual frame rate over the images transferred from the frame buffer 51 to the mass storage device 53 during a time interval of one second. For example, if the inherent frame rate is 30 images per second, the sample frame rate is equal in number to ninety-nine. The sample frame rate is supplied to the sampling cycle counter 103 and a performance value setting unit 105 described later. The sampling cycle counter 103 counts the number of cycles that the frame rate counter 102 counts the sample frame rate in response to the sample frame rate and the output of the timer 101. An output of the sampling cycle counter 103 is supplied to a cycle comparator 104 as a sampling cycle signal. The cycle comparator 104 compares the value represented by the cycle signal with a predetermined threshold α to produce a comparison result signal. The threshold α is set as a positive integer larger than one, which in this embodiment is equal in number to three. The performance value setting unit 105 sets a performance value for the mass storage device 53 when the comparison result signal indicates that the sampling cycle exceeds the threshold α. More particularly, the performance value setting unit 105 calculates the performance value by means of setting an intermediate value of sample frame rate as the performance value for the mass storage device 53. This performance value is considered as the inherent frame rate available for the mass storage device 53 and supplied to a frame rate comparator 111.

A free capacity determining unit 106 is connected to the main memory 52 and the mass storage device 53 to determine a free capacity available in each storage to supply a signal to a record time calculating unit 107, indicating the available free capacity. The free capacity determining unit 106 determines the free capacity according to maximam capacity of the media and memory quantity stored into the media. The free capacity determining unit 106 is also connected to a media selector 112. In addition, the record time calculating unit 107 is connected to the manipulation size setting unit 60. Operation of the free capacity determining unit 106 and the record time calculating unit 107 will be described more in detail in conjunction with FIG. 7.

Referring to FIG. 6, the storage condition control section 110 comprises the frame rate comparator 111 and the media selector 112. The frame rate comparator 111 compares the inherent frame rate indicated by the performance value with the set frame rate set in the manipulation size setting unit 60. An output of the frame rate comparator 111 is supplied to the media selector 112. The media selector 112 selects a medium where the image data should be stored in response to the comparison result supplied to the frame rate comparator 111. The media selector 112 is connected to the free capacity determining unit 106, a frame rate changing unit 113 and a mask region changing unit 114.

Figure 7:
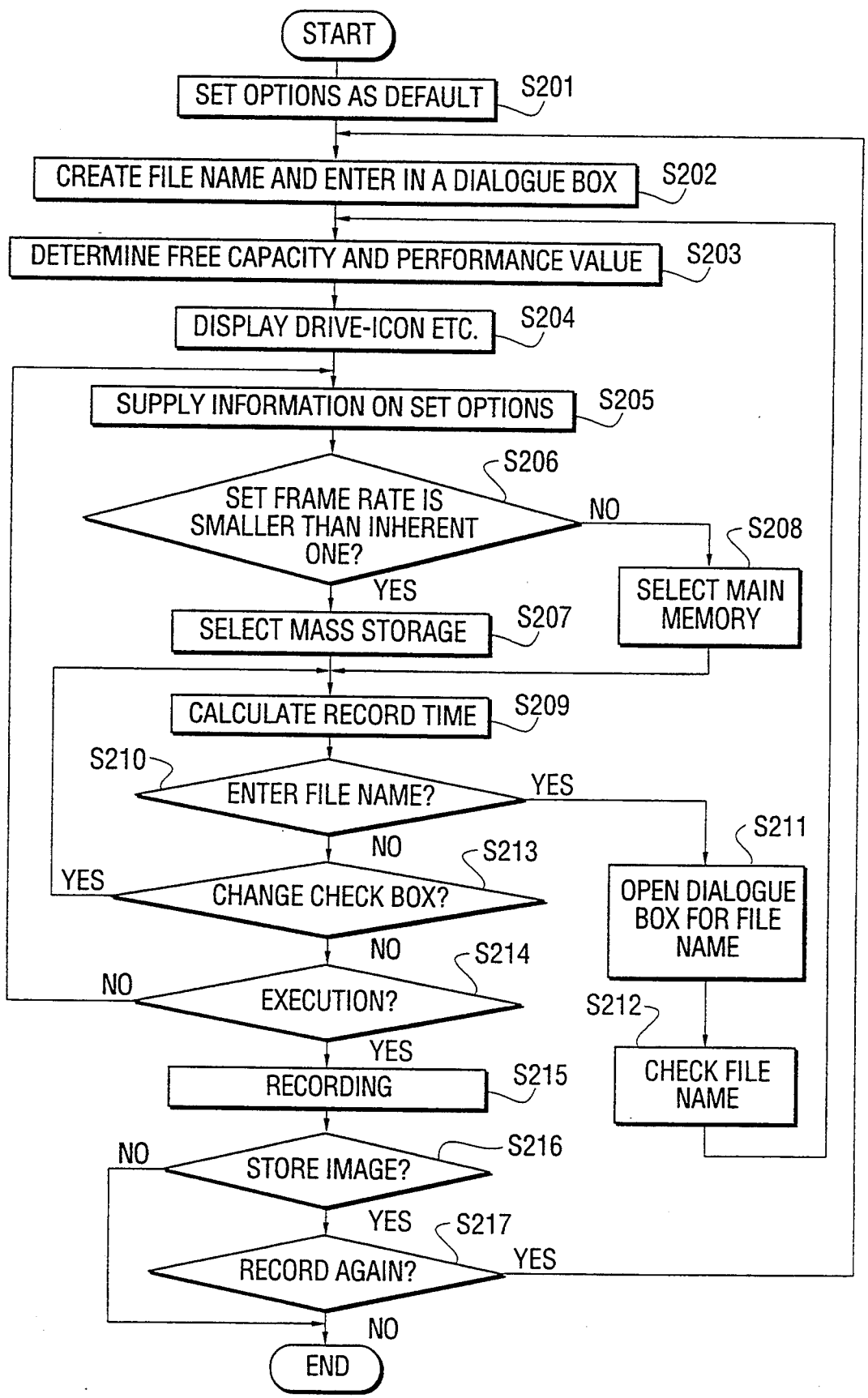
FIG. 7 is a flow chart of a preferable control operation carried out by the apparatus shown in FIG. 1.

Operation of the performance determining section 100 and the storage condition control section 110 is now described with reference to FIGS. 7 and 8. FIG. 7 is a flow chart of a preferable control operation carried out by the apparatus according to the present invention. FIG. 8 is a flow chart of a subroutine of the control operation carried out by the performance determining section 100. It should be understood that the operation described generally in conjunction with FIG. 3 is a fundamental feature of the present invention. The following is a preferable and detailed description on the operation according to the present invention.

The control in FIG. 7 begins when the image pick-up device 10 supplies the image data to the frame buffer 51. The options already chosen by the user's action is pertained as a default at step S201, i.e., a set of operating conditions that is automatically used when the apparatus of this invention is first switched on, or after it is reset. At step S202, a user creates a nominated file name and enters it in a dialogue box (not shown). The nominated file name in this embodiment is "MOVIE" as shown in FIG. 2. The performance determining section 100 then determines, at step S203, a free capacity of the storage and the inherent frame rate. In this event, the performance determining section 100 uses a dummy file (not (not shown) for the determination. This processing is described with reference to FIG. 8.

When the timer 102 starts to count the time at step S301, CPU 30 transfers the (dummy) image data of n by m from the frame buffer to the mass storage device 53 at step S302. CPU 30 then determines at step S303 if the time interval obtained by the timer 102 represents $(1-a)$ seconds. In this event, a represents a safety coefficient which is equal to, for example, 0.1 seconds. When the time interval $(1-a)$ has already passed, control succeeds to step S304 to store the sample frame rate obtained by the frame rate counter 102 in the mass storage device 53. If the answer at step S303 is negative, step S302 is executed again. This continues until the time interval $(1-a)$ has passed. The sampling cycle counter 103 counts the number of cycles that the frame rate counter 102 counts the sample frame rate to produce the sampling cycle signal. In response to this, the cycle comparator 104 compares at step S305 the value represented by the cycle signal with a predetermined threshold α to produce a comparison result signal. The threshold α in this embodiment is equal in number to three. At step S306, when the comparison result signal indicates that the sampling cycle exceeds the threshold α, the performance value setting unit 105 sets an intermediate value of sample frame rate as the performance value for the mass storage device 53. The performance value is considered as the inherent frame rate of the mass storage device 53. The performance value is odd value. The intermediate value is the center of the odd value. The performance value may be, for example, 7.5 images per second. In addition, it takes three seconds to complete the performance determination processing. As mentioned above, two mask options are available in the present embodiment: 160 by 120 pixels and 80 by 60 pixels. Accordingly, operation as shown in FIG. 8 is made twice, which takes six seconds in total. The performance value setting unit 105 then supplies the inherent frame rate calculated to the data storage controlling arrangement 40.

Turning back to FIG. 7, drive-icon, freesize, the filename are displayed at step S204 on the monitor to choose the file. The freesize represents size of the free free capacity. The drive-icon represents character and letter. At the subsequent step S205, the manipulation size setting unit 60 supplies information on the set options such as the set frame rate and the set mask region to the frame rate comparator 111. The frame rate comparator 111 compares, at step S206, the set frame rate with the inherent frame rate. More particularly, the image data is transferred into the mass storage device 53 at step S207 when the inherent frame rate is larger than or equal to the set frame rate. On the contrary, the image data is transferred into the main memory 52 at step S208 when the inherent frame rate is smaller than the set frame rate. The set frame rate may be 15 images per seconds and thus the inherent frame rate of 7.5 images per seconds results in selection of the main memory 52. The record time calculating unit 107 calculates a record time at step S209. In this event, the record time can be obtained in accordance with the manipulation size or options chosen as well as the free capacity of the main memory 52 and the mass storage device 53. The record time represents a time interval available for transferring and storing the image data into the main memory 52 or the mass storage device 53. The record time can be obtained by means of dividing the free capacity by the frame rate. The image data is stored in the mass storage device 53 over the record time obtained. The record time may be, for example, three minutes at maximum.

Subsequently, CPU 30 determines at step S210 whether or not a fresh file name is entered. When step S210 is affirmative, indicating that a fresh file name is entered, a file name dialogue box is opened at step S211 to check the fresh file name at step S212. After completion of file name checking, step S203 is executed again. In this manner, steps S203 through S212 are repeated as long as a file name is refreshed. On the other hand, step S210 is followed by step S213 for the negative answer. At step S213, the data storage controlling arrangement 40 determines if it is necessary to change the options set in the manipulation size setting unit 60. In this event, the frame rate changing unit 113 changes the set frame rate when the media selector 112 selects the main memory 52. More particularly, the frame rate changing unit 113 selects the frame rate smaller than the one currently chosen. After changing the frame rate, control returns to step S209. For example, when the inherent frame rate is 7.5 images per second, the set frame rate is changed from 15 images per second to 7.5 images per seconds. Then, step S206 is executed again to compare the "renewed" set frame rate and with the inherent frame rate. In the example above, this comparison results in selection of the mass storage device 53. It is noted that control passes steps S209 and S210 only once if step S213 is negative.

On the contrary, when the media selector 112 selects the mass storage device 53 as the storage for the image data, the mask region changing unit 114 changes the set mask region. In this example, the mask region changing unit 114 changes the mask region of ½ size into that of ¼ size to store the image data of 80 by 60 pixels. Subsequently, step S205 is again executed and steps S205 through S213 are repeated.

After completion of step S213, it is determined at step S214 whether or not the OK button 67 is chosen. If the OK button 67 has not yet been chosen, steps S205 through S214 are repeated. This continues until the user chooses the OK button 67. If the OK button 67 is chosen, the recording operation is executed at step S215. The recording operation is the processing of the step S1 and S2. Processing of the recording operation is the most effective when executed after selecting the media. The data storage controlling arrangement 40 determines at step S216 if it is necessary to store the image data in the media selected by the media selector 112. If necessary, the recording operation is again carried out at step S217 and steps S202 through S216 are repeated. Then the processing is completed. If the main memory 52 is selected to store the image data, the data is read out of the memory 52 and transferred to the mass storage device 53 in which it is stored.

The present invention may be embodied in other specific forms without departing from the spirit or essential attributes thereof. Accordingly, reference should be made to the appended claims, rather than to the foregoing specification, as indicating the scope of the invention.

What is claimed is:

1. An apparatus for controlling manipulation and storage of image data comprising:
   image acquiring means for acquiring images of a plurality of frames to produce image data;
   first storing means, having rapid access but low storage capacity, for storing the image data supplied from said image acquiring means;
   second storing means, holding a vast amount of memory but having slow access, for storing the image data supplied from said image acquiring means;
   manipulation size setting means for setting a manipulation size of said image data including setting a mask region and setting a frame rate both of which are necessary for storing the image data obtained by said image acquiring means into said second storing means; and
   data storage controlling means for controlling a storage of the image data into said first and second storing means such that said second storing means stores the image data when an inherent frame rate of said second storing means is larger than or equal to the set frame rate and said first storing means stores the image data when the inherent frame rate of said second storing means is smaller than the set frame rate.

2. An apparatus for controlling manipulation and storage of image data as claimed in claim 1, wherein said image acquiring means comprises:
   image pick-up means for picking up said images of a plurality of frames to produce said image data; and
   image buffering means for memorizing and buffering the image data for transfer to one of said first and second storing means.

3. An apparatus for controlling manipulation and storage of image data as claimed in claim 2, wherein said data storage controlling means comprises:
   performance determining means for determining a performance value to represent the inherent frame rate of said second storing means; and
   storage condition controlling means for controlling a storage condition of the image data into a selected one of the first storing means and second storing means according to said inherent frame rate to represent said performance value and said set frame rate.

4. An apparatus for controlling manipulation and storage of image data as claimed in claim 1, wherein said data storage controlling means comprises:
  performance determining means for determining a performance value to represent the inherent frame rate of said second storing means; and
  storage condition controlling means for controlling a storage condition of the image data into a selected one of the first storing means and second storing means according to said inherent frame rate to represent said performance value and said set frame rate.

5. An apparatus for controlling manipulation and storage of image data as claimed in claim 4, wherein said storage condition controlling means comprises:
  frame rate comparing means for comparing the inherent frame rate available for said second storing means with the set frame rate; and
  media selecting means for selecting said second storing means when the inherent frame rate is larger than or equal to the set frame rate, and selecting said first storing means when the inherent frame rate is smaller than the set frame rate.

6. An apparatus for controlling manipulation and storage of image data as claimed in claim 4, wherein said performance determining means comprises:
  time counting means for counting a time interval for determining the inherent frame rate suitable for the set mask region for said second storing means; and
  frame rate counting means for counting a frame rate during said time interval counted by said time counting means.

7. An apparatus for controlling manipulation and storage of image data as claimed in claim 6, wherein said performance determining means further comprises:
  sampling cycle counting means for counting, when said frame rate counting means cyclically counts the frame rate a plural times in response to the frame rate and the time interval counted by said time counting means, a number of cycles representing a number of the plural times;
  cycle comparing means for comparing the number of cycles for the frame rate with a predetermined number of cycles; and
  performance value setting means for setting said performance value according to the frame rate obtained, when the number of cycles for the frame rate exceeds a predetermined number of cycles.

8. An apparatus for controlling manipulation and storage of image data as claimed in claim 4, wherein said performance determining means further comprises:
  free capacity determining means for determining a free capacity of each of said first storing means and said second storing means according to a maximum capacity of each of the first and second storing means and a memory quantity stored into each of the first and second storing means; and
  record time calculating means for calculating a record time during which the image data is recorded into said second storing means according to the free capacity and the inherent frame rate for the set mask region.

9. An apparatus for controlling manipulation and storage of image data as claimed in claim 4, wherein said storage condition controlling means comprises mask region changing means for changing the set mask region set in said manipulation size setting means into another set mask region.

10. An apparatus for controlling manipulation and storage of image data as claimed in claim 4, wherein said storage condition controlling means comprises frame rate changing means for changing the set frame rate set in said manipulation size setting means to a smaller frame rate when the inherent frame rate is smaller than the set frame rate, thereby storing the image data into said second storing means.

11. A method for controlling manipulation and storage of image data comprising the steps of:
  acquiring images of a plurality of frames to produce image data;
  storing said image data in a first storage device and a second storage device, said first storage device offering rapid access but low storage capacity, said second storage device holding a vast amount of memory but offering slow access;
  setting a manipulation size of said image data, including setting a mask region and setting a frame rate both of which are necessary for storing the image data into said second storage device; and
  controlling a storage of the image data into said first and second storage devices such that said second storage device stores the image data when an inherent frame rate of said second storage device is larger than or equal to the set frame rate and said first storage device stores the image data when the inherent frame rate of said second storage device is smaller than the set frame rate.

12. A method for controlling manipulation and storage of image data as claimed in claim 11, wherein said step of acquiring the image comprises the steps of:
  picking up said images of a plurality of frames; and
  memorizing and buffering the image data for transfer to one of the first and second storage devices.

13. A method for controlling manipulation and storage of image data as claimed in claim 12, wherein said step of controlling storage of the image data comprises the steps of:
  determining a performance value to represent the inherent frame rate of said second storage device; and
  controlling a storage condition of the image data, into a selected one of the first storage device and the second storage device according to said inherent frame rate to represent said performance value and said set frame rate.

14. A method for controlling manipulation and storage of image data as claimed in claim 11, wherein said step of controlling storage of the image data comprises the steps of:
  determining a performance value to represent the inherent frame rate of said second storage device; and
  controlling a storage condition of the image data, into a selected one of the first storage device and the second storage device according to said inherent frame rate to represent said performance value and said set frame rate.

15. A method for controlling manipulation and storage of image data as claimed in claim 14, wherein said step of controlling a storage condition comprises the steps of:
  comparing the inherent frame rate available for the second storage device with the set frame rate; and
  selecting the second storage device when the inherent frame rate is larger than or equal to the set frame rate, and selecting the first storage device when the inherent frame rate is smaller than the set frame rate.

16. A method for controlling manipulation and storage of image data as claimed in claim 14, wherein said step of determining a performance value comprises the steps of:
   counting a time interval for determining the inherent frame rate suitable for the set mask region for the second storage device; and
   counting a frame rate during said time interval counted by said step of counting a time interval.

17. A method for controlling manipulation and storage of image data as claimed in claim 16, wherein said step of determining a performance value comprises the steps of:
   counting, when said step of counting a frame rate cyclically counts the frame rate a plural times in response to the frame rate and the time interval counted by said step of counting a time interval, a number of cycles representing a number of the plural times;
   comparing the number of cycles for the frame rate with a predetermined number of cycles; and
   setting said performance value according to the frame rate obtained, when the number of cycles for the frame rate exceeds a predetermined number of cycles.

18. A method for controlling manipulation and storage of image data as claimed in claim 14, wherein said step of determining performance value further comprises the steps of:
   determining a free capacity of each of the first storage device and the second storage device according to a maximum capacity of each of the first and second storage devices and a memory quantity stored into each of the first and second storage devices; and
   calculating a record time during which the image data is recorded into the second storage device according to the free capacity and the inherent frame rate for the set mask region.

19. A method for controlling manipulation and storage of image data as claimed in claim 14, wherein said step of controlling a storage condition comprises a step of changing the set mask region set in said step of setting a manipulation size into another set mask region.

20. A method for controlling manipulation and storage of image data as claimed in claim 14, wherein said step of controlling a storage condition comprises a step of changing the set frame rate set at said step of setting a manipulation size to a smaller frame rate when the inherent frame rate is smaller than the set frame rate, thereby storing the image data into the second storage device.

* * * * *

UNITED STATES PATENT AND TRADEMARK OFFICE
CERTIFICATE OF CORRECTION

PATENT NO.   : 5,440,685
DATED        : August 8, 1995
INVENTOR(S)  : Shushi TAKIYAMA et al.

It is certified that error appears in the above-indentified patent and that said Letters Patent is hereby corrected as shown below:

Column 1 lines 67 and 68, change "Storage" to --storage--.

Column 3 line 33, after "data" insert --,--.

Column 4 lines 67 and 68, change "manipulation" to --device--;

line 68, change "device" to --manipulation--.

Signed and Sealed this

Twenty-fifth Day of March, 1997

*Attest:*

BRUCE LEHMAN

*Attesting Officer*      *Commissioner of Patents and Trademarks*